United States Patent
Giffin, III et al.

[11] Patent Number: 5,809,772
[45] Date of Patent: Sep. 22, 1998

[54] TURBOFAN ENGINE WITH A CORE DRIVEN SUPERCHARGED BYPASS DUCT

[75] Inventors: Rollin G. Giffin, III, Cincinnati; James E. Johnson, Hamilton; David W. Crall, Loveland, all of Ohio; John W. Salvage, Jamesville, N.Y.; Peter N. Szucs, West Chester, Ohio

[73] Assignee: General Electric Company, Cincinnati, Ohio

[21] Appl. No.: 625,498

[22] Filed: Mar. 29, 1996

[51] Int. Cl.[6] .............................. F02K 3/02; F02K 3/07
[52] U.S. Cl. .................... 60/226.1; 60/226.3; 60/262
[58] Field of Search .......................... 60/264, 266, 262, 60/226.1, 226.3, 268

[56] References Cited

U.S. PATENT DOCUMENTS

| | | |
|---|---|---|
| 3,224,194 | 12/1965 | De Feo et al. . |
| 3,296,800 | 1/1967 | Keenan et al. . |
| 3,314,654 | 4/1967 | Thenault et al. . |
| 3,449,914 | 6/1969 | Brown . |
| 3,540,682 | 11/1970 | Dibble ........................................ 60/226.1 |
| 3,688,504 | 9/1972 | Hutchinson et al. . |
| 3,792,584 | 2/1974 | Klees . |
| 3,841,091 | 10/1974 | Sargisson et al. . |
| 3,854,286 | 12/1974 | Klees . |
| 3,879,941 | 4/1975 | Sargisson . |
| 3,886,737 | 6/1975 | Grieb . |
| 3,915,413 | 10/1975 | Sargisson . |
| 4,010,608 | 3/1977 | Simmons . |
| 4,043,121 | 8/1977 | Thomas et al. . |
| 4,050,242 | 9/1977 | Dusa . |
| 4,055,042 | 10/1977 | Colley . |
| 4,064,692 | 12/1977 | Johnson et al. . |
| 4,068,471 | 1/1978 | Simmons . |
| 4,069,661 | 1/1978 | Rundell et al. . |
| 4,080,785 | 3/1978 | Koff et al. . |
| 4,086,761 | 5/1978 | Schaut et al. . |
| 4,169,692 | 10/1979 | McDonough et al. . |
| 4,175,384 | 11/1979 | Wagenknecht et al. . |
| 4,222,235 | 9/1980 | Adamson et al. . |
| 4,285,194 | 8/1981 | Nash . |
| 4,409,788 | 10/1983 | Nash et al. ............................. 60/226.3 |
| 4,446,696 | 5/1984 | Sargisson et al. . |
| 4,791,783 | 12/1988 | Johnson ................................ 60/226.3 |
| 4,958,489 | 9/1990 | Simmons ............................... 60/226.3 |
| 5,048,286 | 9/1991 | Stransky et al. . |
| 5,113,649 | 5/1992 | Siedlecki, Jr. ........................ 60/226.3 |

(List continued on next page.)

OTHER PUBLICATIONS

"5.5 Mass–Flow Ratio or Area Ratio", Jet Propulsion For Aerospace Applications, Second Edition, Pitman Publishing Corp., by Walter J. Hesse & Nicholas V. S. Mumford, Jr., pp. 111–114.

*Primary Examiner*—Timothy Thorpe
*Assistant Examiner*—Ted Kim
*Attorney, Agent, or Firm*—Andrew C. Hess; Patrick R. Scanlon

[57] ABSTRACT

A multiple bypass turbofan engine including a core engine assembly has a fan bypass duct radially outward of the core engine assembly and has first and second inlets disposed between forward and aft fans driven by a low pressure turbine and a core engine turbine respectively. An inlet duct having an annular duct wall is disposed radially inward of the bypass duct and connects the second inlet to the bypass duct and has disposed within a supercharger means for compressing air which is drivingly connected to the core turbine. One embodiment of the aft fan may have radially inner and outer rows of aft fan vane airfoils separated by a non-rotatable portion of the annular duct wall such that the outer row of aft fan vane airfoils are disposed in the inlet duct and at least one of the aft fan vane airfoils is and, preferably, all of which are, independently variable. Radially inner and outer rows of aft fan rotor blade airfoils separated by a rotatable portion of the annular duct wall such that the outer row of aft fan rotor blade airfoils are disposed in the inlet duct adjacent to and longitudinally aft of radially inner and outer rows of aft fan vane airfoils, respectively. The radially outer rows of aft fan vane and rotor blade airfoils provide the supercharger means.

16 Claims, 3 Drawing Sheets

U.S. PATENT DOCUMENTS

| | | | | | |
|---|---|---|---|---|---|
| 5,155,993 | 10/1992 | Baughman et al. | | | |
| 5,261,227 | 11/1993 | Giffin, III | | | 60/226.3 |
| 5,274,999 | 1/1994 | Rohra et al. | | | 60/226.1 |
| 5,305,599 | 4/1994 | Marvin | | | 60/226.3 |
| 5,327,716 | 7/1994 | Giffin, III et al. | | | |
| 5,343,697 | 9/1994 | Johnson et al. | | | 60/226.3 |
| 5,404,713 | 4/1995 | Johnson | | | 60/226.3 |
| 5,406,787 | 4/1995 | Terrier | | | 60/226.3 |

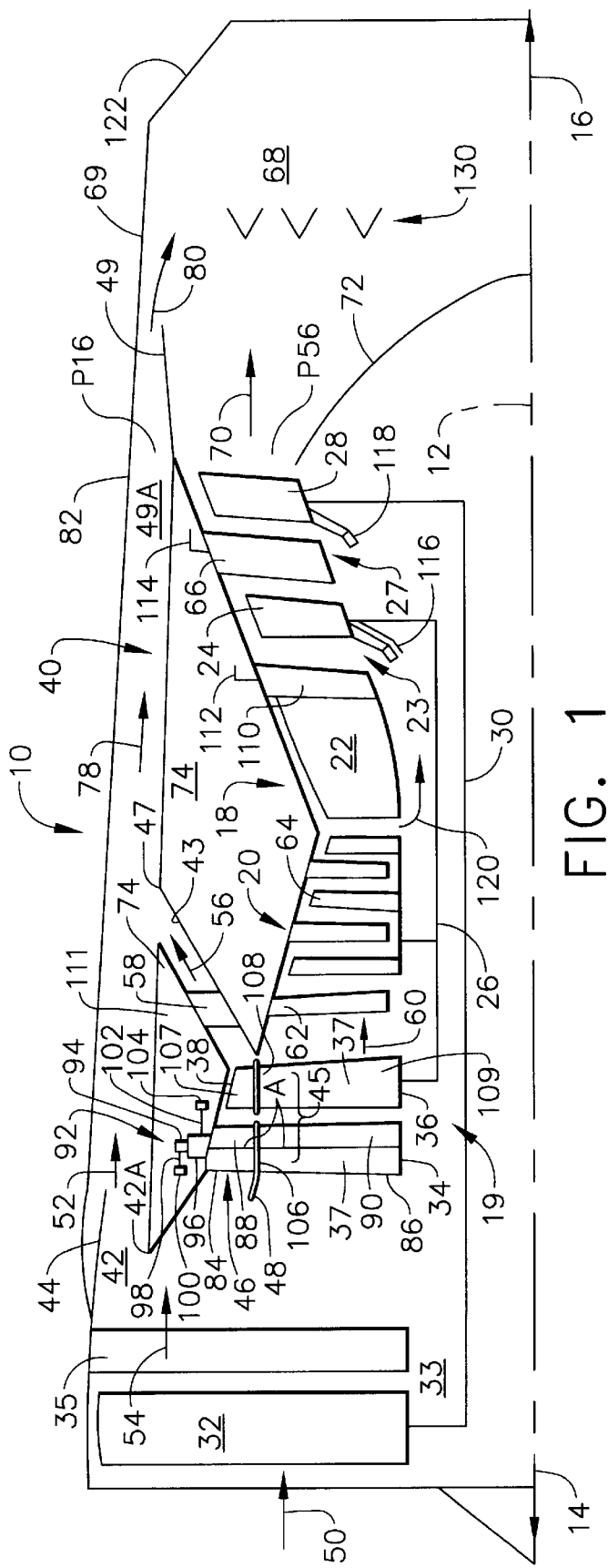
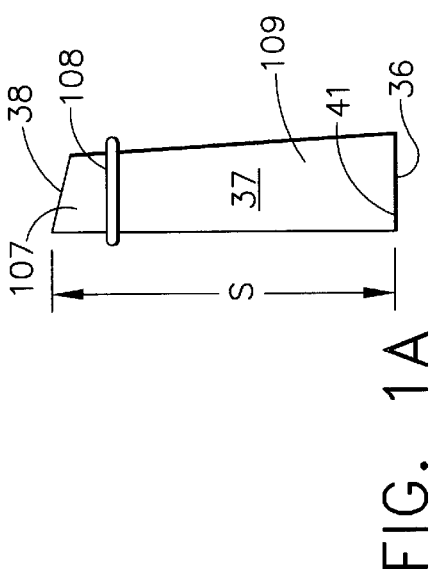
FIG. 1
FIG. 1A

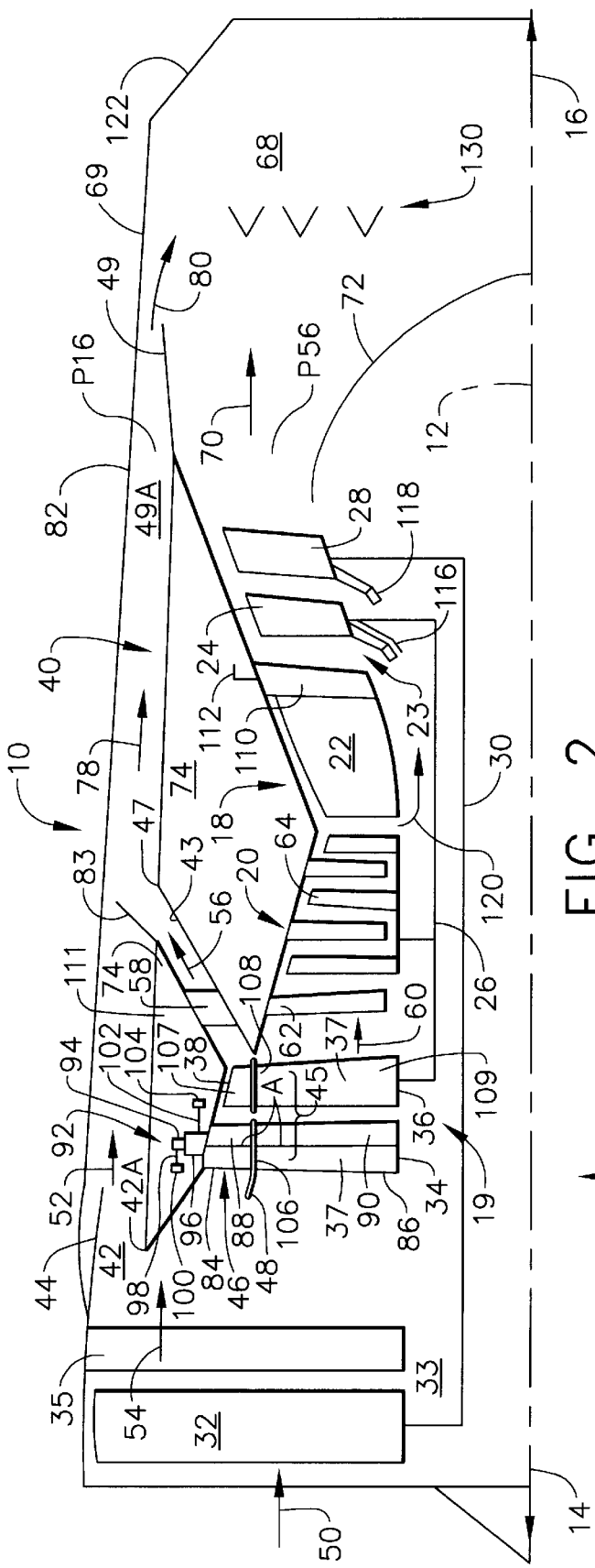
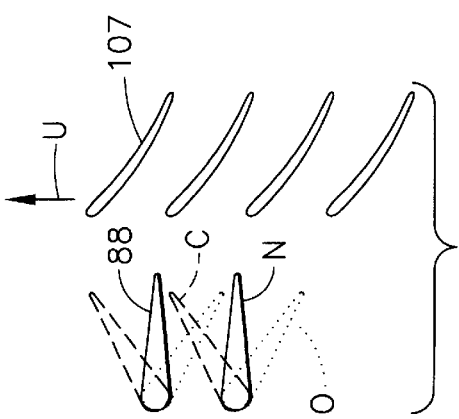
FIG. 2
FIG. 4

TURBOFAN ENGINE WITH A CORE DRIVEN SUPERCHARGED BYPASS DUCT

BACKGROUND OF THE INVENTION

Field of the Invention

The present invention relates generally to variable cycle aircraft gas turbine engines and, more particularly, to a variable cycle aircraft gas turbine engine having a core driven supercharger in a bypass duct. More particularly the supercharger may be a core driven fan with a variable stator tip controlling the airflow and pressure ratio of a core driven fan tip in the bypass duct.

A conventional gas turbine engine includes a core engine having in serial, axial flow relationship, a high pressure compressor to compress the airflow entering the core engine, a combustor in which a mixture of fuel and the compressed air is burned to generate a propulsive gas flow, and a high pressure turbine which is rotated by the propulsive gas flow and which is connected by a large diameter shaft to drive the high pressure compressor. A typical bypass turbofan engine adds a low pressure turbine aft of the high pressure turbine and adds a forward fan forward of the high pressure compressor.

In a typical variable bypass ratio design as disclosed in U.S. Pat. No. 4,068,471, the front fan includes one or more forward rows of fan rotor blades connected to a small diameter drive shaft, which runs through the hollow large diameter shaft and is driven by the low pressure turbine. An aft fan having one or more aft rows of fan rotor blades are connected to the larger-diameter drive shaft which is driven by the high pressure turbine and are disposed in serial, axial flow relationship between the forward fan and the high pressure compressor. A variable area bypass injector is located between the forward and aft fans to vary the amount of air entering a first inlet of a fan bypass duct which varies the fan bypass ratio of the engine (i.e., the ratio of the air flowing through the fan bypass duct to the air flowing through the core engine) from which comes the term variable cycle to describe the engine. The fan bypass duct has a second inlet located aft of the aft row of fan blades. Control of airflow directed into the first and second bypass duct inlets was typically accomplished by selector valve mechanisms and some more particular valves called variable bypass injectors commonly referred to as VABIs.

An engine having a fan bypass duct with two or more inlets may be called a multiple bypass stream variable cycle gas turbine engine. A row of stator vanes is typically located just forward of each forward and aft row of fan blades. Selected rows of stator vanes are variable, typically variable angle, to vary the angle of the flow seen by the rotor blades. Some of the engine thrust comes from the propulsive gases exiting the core engine and some from the airflow exiting the fan bypass duct.

There exists a need for a multiple bypass stream variable cycle gas turbine engine that is capable of efficiently holding core airflow essentially constant or alternatively varying it while the bypass flow and the energy added to the second inlet of the bypass duct can be independently decreased without wasting energy in the form of higher than needed pressure in the bypass flow to the bypass duct supplied through the second inlet.

SUMMARY OF THE INVENTION

A multiple bypass turbofan engine including a core engine assembly comprising in downstream serial flow relationship an aft core driven fan (CDF), a core compressor, a core combustor, and a core turbine. The core turbine is drivingly connected to the aft fan and the core compressor by a core engine shaft. The engine further includes a low pressure turbine driven forward fan upstream and forward of the aft fan and drivingly connected to a low pressure turbine by a low pressure shaft, the low pressure turbine being aft of and in serial flow communication with the core turbine. A fan bypass duct is disposed radially outward of the core engine assembly and has first and second inlets disposed between the forward and aft fans. An inlet duct having an annular duct wall is disposed radially inward of the bypass duct and connects the second inlet to the bypass duct. A supercharger means for compressing air is drivingly connected to the core turbine and is disposed in the inlet duct. One embodiment of the aft fan may have radially inner and outer rows of aft fan vane airfoils separated by a non-rotatable portion of the annular duct wall such that the outer row of aft fan vane airfoils are disposed in the inlet duct and at least one of the aft fan vane airfoils is, and preferably all are, independently variable. Radially inner and outer rows of aft fan rotor blade airfoils separated by a rotatable portion of the annular duct wall such that the outer row of aft fan rotor blade airfoils are disposed in the inlet duct adjacent to and longitudinally aft of radially inner and outer rows of aft fan vane airfoils, respectively. The radially outer rows of aft fan vane and rotor blade airfoils provide the supercharger means and preferably includes a means for independently varying the radially outer and inner rows of aft fan vane airfoils. A more particular embodiment provides the outer vane airfoils with pivotable, trailing-edge outer flaps and the inner vane airfoils with independently pivotable, trailing-edge inner flaps preferably such that the varying means includes means for independently pivoting the flaps. The radially inner and outer rows of aft fan vane airfoils may be indexed and generally aligned and the radially inner and outer rows of aft fan rotor blade airfoils may be indexed and generally aligned.

A more particular embodiment of multiple bypass turbofan engine of the present invention provides the aft fan with a row of aft fan rotor blades disposed adjacent to and longitudinally aft of a row of aft fan stator vanes. The aft fan rotor blades have airfoils that generally extends radially outward from blade airfoil bases to airfoil tips and at least one of the aft fan stator vanes has an independently variable radially outer vane tip portion and an independently variable radially inner vane hub portion separated by a non-rotatable portion of the annular duct wall. The aft fan blades have radially outer airfoil tip sections and radially inner hub sections of airfoils separated by a rotatable portion of the annular duct wall such that the tip sections are disposed in the inlet duct. The vane tip portion may be fully pivotable or have a pivotable trailing-edge flap and the vane hub portion may include an independently pivotable trailing-edge flap. The varying means may further include means for independently pivoting the flaps. Preferably, all the fan stator vanes have an independently variable vane tip portion and an independently variable vane hub portion separated by the annular duct wall.

The multiple bypass turbofan engine may also provide the core turbine with a row of high pressure turbine stator vanes and means for varying the flow area of the high pressure turbine nozzle vanes. The low pressure turbine may further include a row of counter-rotating low pressure turbine rotor blades disposed longitudinally adjacent and longitudinally aft of the core turbine such that the row of low pressure turbine blades are operable to counter-rotate relative to high pressure turbine rotor blades in the core turbine during engine operation. Alternatively, the low pressure turbine may further include a row of low pressure turbine rotor blades disposed longitudinally adjacent and longitudinally aft of the core turbine, a row of low pressure turbine stator vanes disposed longitudinally between the core turbine aft and the forward row of low pressure turbine blades and means for varying the flow area of the low pressure turbine nozzle vanes.

ADVANTAGES OF THE INVENTION

The present invention provides advantages over previous inventions. Several benefits and advantages are derived from having independently variable radially inner and radially outer portions of the fan stator vanes in a multiple bypass stream, variable bypass ratio turbofan engine. For example, with the split, variable stator vane feature, the core airflow can be held essentially constant while the bypass flow and the energy added to the second inlet of the bypass duct can be independently decreased without decreasing the engine's efficiency. Alternatively, the split variable stator vane feature can be used so the core airflow can be increased while the bypass flow and the energy added to the second inlet of the bypass duct can be independently decreased without decreasing the engine's efficiency. The improved engine efficiency is a result of providing the ability to independently vary the pressure ratio across inner hub and outer tip sections or airfoils of the CDF which the prior art does not provide for. Also, this feature can improve engine efficiency by increasing the range to choke of the bypass stator vane airfoils or tip sections located in the inlet duct downstream of the second inlet to the bypass duct. Varying the flow area of the high pressure turbine nozzle vanes in response to varying engine operating conditions can further increase engine efficiency.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

FIG. 1 is a schematic cross-sectional side view of a bypass turbofan engine incorporating the invention wherein the engine includes a variable low pressure turbine nozzle;

FIG. 1A is an enlarged more detailed view of the aft fan blade in FIG. 1;

FIG. 2 is a schematic cross-sectional side view of a bypass turbofan engine incorporating the subassembly of the invention wherein the engine includes counter-rotating high and low pressure turbines and wherein the low pressure turbine nozzle is omitted;

FIG. 4 is a diagrammatic top view of pivotable trailing-edge tip flaps and outer blade tip portions of the turbocharger means of the present invention.

DETAILED DESCRIPTION

Figure 3:
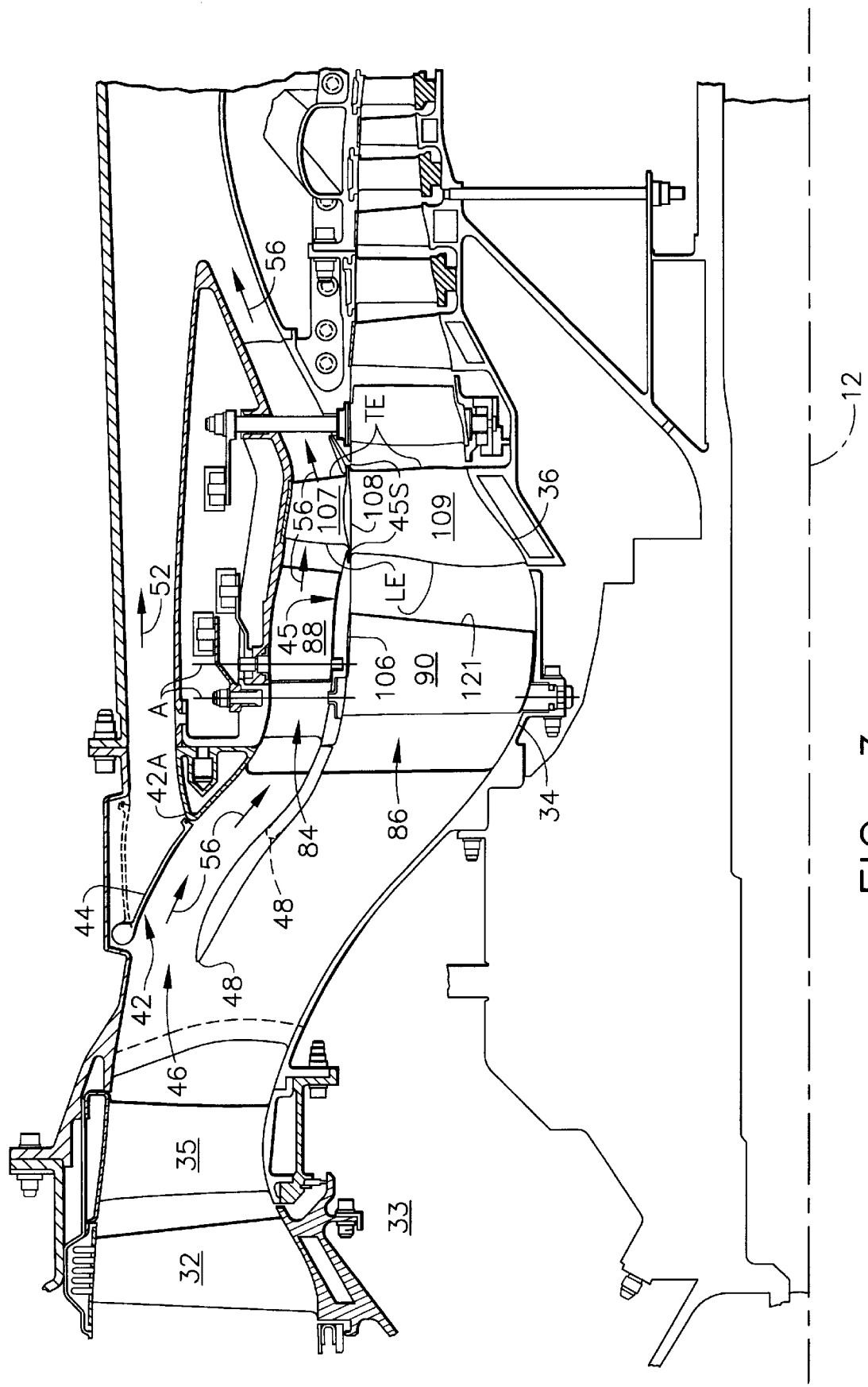
FIG. 3 is a cross-sectional side view of a forward section of the engine illustrating a more particular embodiment of the fan bypass assembly and turbocharger of the present invention.

Referring now to the drawing, there is illustrated in the FIGS. a bypass turbofan engine 10 having a generally longitudinally extending axis or centerline 12 generally extending in a forward direction 14 and an aft direction 16.

The bypass turbofan engine 10 includes a core engine 18 (also called a gas generator) which includes a core driven fan (CDF) 19, a high pressure compressor 20, a combustor 22, and a high pressure turbine (HPT) 23 having a row of high pressure turbine (HPT) blades 24, all arranged in a serial, axial flow relationship. High pressure compressor blades 64 of the high pressure compressor 20 and the CDF 19 are fixedly interconnected in driving engagement to the high pressure turbine blades 24 by a larger diameter annular core engine shaft 26 which is disposed coaxially about the centerline 12 of the engine 10 forming a high pressure spool.

The core engine 18 is effective for generating combustion gases. Pressurized air from the high pressure compressor 20 is mixed with fuel in the combustor 22 and ignited, thereby, generating combustion gases. Some work is extracted from these gases by the high pressure turbine blades 24 which drives the high pressure compressor 20. The combustion gases are discharged from the core engine 18 into a power turbine or low pressure turbine (LPT) 27 having a row of low pressure turbine rotor (LPT) blades 28. The low pressure turbine rotor blades 28 are fixedly attached to a smaller diameter annular low pressure shaft 30 which is disposed coaxially about the centerline 12 of the engine 10 within the core engine shaft 26 forming a low pressure spool. The low pressure shaft 30 rotates a more longitudinally forward row of generally radially outwardly extending and circumferentially spaced-apart forward fan rotor blades 32 of a forward fan 33. The core engine shaft 26 also rotates a more longitudinally aft row of circumferentially spaced apart core driven or aft fan rotor blades 36 having generally radially outwardly extending blade tips 38. The aft fan rotor blades 36 are disposed longitudinally aft of the more longitudinally forward row of forward fan rotor blades 32. A row of circumferentially spaced-apart aft fan stator vanes 34 (attached at either or both radial ends) is disposed longitudinally between the rows of the forward and aft fan rotor blades 32 and 36, respectively, and longitudinally adjacent and in direct serial flow relationship with the row of the aft fan rotor blades 36. Note that there may be one or more additional rows of fan rotor blades and/or fan stator vanes disposed longitudinally forward of the row of the forward fan rotor blades 32 and/or longitudinally between the row of the forward fan rotor blades 32 and the row of the aft fan stator vanes 34. The only additional row shown in the FIGS. is an optional preferred row of forward fan stator vanes 35 disposed longitudinally adjacent and longitudinally aft of the row of forward fan rotor blades 32. The term "longitudinally adjacent" is used herein, for the purposes of this patent, to mean that there are no other rotor blade rows and/or stator vane rows between the named longitudinally adjacent elements (i.e., between the more forward row of fan rotor blades 32 and the optional additional row of fan stator vanes 35).

A fan bypass duct 40 has a first inlet 42 disposed longitudinally between the forward fan 33 and the aft or core driven fan 19. When the optional additional row of forward fan stator vanes 35 is present, the first inlet 42 is disposed longitudinally between the optional additional row of forward fan stator vanes 35 and the aft row of fan stator vanes 34. The first inlet 42 includes a front selector valve door 44 and a first flow splitter 42A. A second inlet 46 to the fan bypass duct 40 is also disposed longitudinally between the forward fan 33 and the aft or core driven fan 19, thereby providing two parallel bypass flowpaths into the fan bypass duct from the forward fan. The fan bypass duct 40 is in fluid communication with the second inlet 46 by way of a second inlet duct 43 having a second inlet duct outlet 47 to the fan bypass duct 40. The second inlet 46 includes an annular duct wall 45 with a second flow splitter 48. The annular duct wall 45 includes a rotatable portion 108 that is disposed radially between outer blade tip portions 107 and radially inner blade hub portions 109, respectively of blade airfoils 37 of the aft fan blades 36. The annular duct wall 45 also includes a non-rotatable portion 106 that is disposed between, preferably variable angle, radially outer vane tip portions 84 and radially inner vane hub portions 86 of the fan vanes 34. The fan bypass duct outlet 49A is disposed longitudinally aft of the second inlet 46 and includes an optional rear variable area bypass injector (VABI) door 49.

The engine or fan airflow 50 passes through the more forward row of fan blades 32 and is then split into a core air portion 60 and bypass flow 54. The bypass flow 54 may include one or both of a first bypass air portion 52 which passes through the first inlet 42 of the fan bypass duct 40 and a second bypass air portion 56 which passes through the second inlet 46 of the fan bypass duct 40, depending on the engine's operation. At high power the first bypass air portion 52 is substantially zero and the second bypass air portion 56 is at or near maximum. At part power as the second bypass air portion 56 is decreased the first bypass air portion 52 increases in more or less direct proportion. When the front selector valve door 44 is closed, the fan airflow 50 is split between the core air portion 60 passing through the row of fan stator vanes 34 and the more aft row of fan blades 36 and the second bypass air portion 56. The second bypass air portion 56 passes through the second inlet 46 and past the outer vane tip portions 84 and the blade tip portions 107 together which provide a supercharger means for compressing the second bypass air portion 56 in the second inlet bypass duct 43. The blade tip portions 107 compress or supercharge the second bypass air portion 56, and the variable outer vane tip portions 84 provide control together, thus, providing preferably variable and controllable supercharging of the second bypass air portion 56, which under certain operating conditions, may be essentially all of the bypass flow passing around the core engine 18 through the fan bypass duct 40 when the selector valve 44 is in a fully closed position. A row of bypass stator vanes 58 are disposed in the second inlet duct 43 to help provide a tailored local flowpath design that permits the first bypass air portion 52 to mix with the second bypass air portion 56 with a minimal amount of losses.

The core air portion 60, in serial flow, passes through the high pressure compressor stator vanes 62 and the high pressure compressor rotor blades 64 of the high pressure compressor 20; the combustor 22; the row of high pressure turbine blades 24; a row of low pressure turbine stator vanes 66; and the row of low pressure turbine blades 28. The core air portion 60 is discharged from the low pressure turbine 27 past the low pressure turbine blades 28 between the engine inner casing 74 and a centerbody 72 at which point it is referred to as a core discharge airflow 70. The combined bypass air 78 (first bypass air portion 52 plus second bypass air portion 56) flows through the rear variable area bypass injector (VABI) door 49 where it is injected into a tail pipe 69 as bypass discharge flow 80 and mixed with the core discharge airflow 70. Note that though the forward and aft fans are illustrated with single stages of fan blades and fan vanes, the present invention includes multiple stages in both the forward and aft or core driven fan. The same is true for the turbine stages.

Illustrated in FIG. 2 is an alternative embodiment for which the fan bypass duct 40 may optionally further include an intermediate mixer door 83 which is disposed longitudinally between the second inlet 46 and the outlet 47 and which is positionable for conrtolling the operating line of the blade tips 38 of the core driven fan 19 and adjusting the static pressure level to maintain the mixing potential of the outer and inner bypass flows illustrated as the first and second bypass air portions 52 and 56 respectively.

Preferably, the turbocharging means includes means 92 for independently varying at least one and, preferably all, of the angles of the radially outer vane tip portions 84 and the radially inner vane hub portions 86 of the fan vanes 34 about respective axis A. Such means may also be described as to include at least one of the fan stator vanes 34 having a variable one of the vane tip portions 84 and an independently variable one of the radially inner hub portions 86. Preferably, the vane tip portion 84 includes a pivotable trailing-edge tip flap 88 and the radially inner hub portion 86 includes a pivotable trailing-edge inner flap 90.

A more particular embodiment of the invention provides the varying means 92 with means for independently pivoting the tip flaps 88 and inner flaps 90. Such pivoting means may include an inner shaft 94 rotatable about the axis A and coaxially disposed within an outer shaft 96. The inner shaft 94 is turned by a lever arm 98 actuated by a unison ring 100 and the outer shaft 96 turned by a separate lever arm 102 actuated by a separate unison ring 104, with the inner shaft 94 attached to the pivotable trailing edge inner flap 90 of the inner hub portion 86 of the fan stator vane 34 and the outer shaft 96 attached to the pivotable trailing edge tip flap 88 of the outer portion 84 of the fan stator vane 34. It is noted that the lever arms 98 and 102 and the unison rings 100 and 104 are all disposed radially outward of the fan stator vanes 34. Other such pivoting means include those known for pivoting variable stator vanes of high pressure compressors in jet engines and the like.

The non-rotatable portion 106 and the rotatable portion 108 of the annular duct wall 45 are located at a part span position in the present invention and are different from the mid span or mid shrouds of more conventional and prior art designs. The non-rotatable portion 106 and the rotatable portion 108 of the annular duct wall 45 segregate the tip portion from the hub portions of the blade airfoil or inner and outer airfoils and associated airflows. The rotatable portion 108 of the blade airfoils 37 of the aft fan blades 36 is literally an extension to the front stage of an otherwise conventional core compressor. In a preferred embodiment, all of the fan stator vanes 34 in its row have a variable outer vane tip portion 84 and an independently variable radially inner hub portion 86. The varying means 92 is preferably operable to vary all of the vane tip portions 84 as a group and independently vary all of the radially inner portions 86.

The rotatable portion 108 of the annular duct wall 45 that rotates with high pressure compressor blades 64 of the high pressure compressor 20 and the CDF 19 blades replaces the conventional casing over a first stage rotor blades in a conventional core compressor configuration. The goal of this particular design is to otherwise retain all of the features of a conventional core compressor. The radially outer blade tip portion 107 must deliver a pressure such that it's airflow is mixable with the gas flow exiting from the low pressure turbine 27. It is desirable for the pressure at the aft portion of the bypass duct, labeled P16, ratioed to the pressure of the gas exiting from the low pressure turbine, labeled P56, to be between 1.02 and 1.08 for good mixing to take place with a minimum of losses and which appears to result in the best cycle. However, under various engine operating conditions and for a variety of reasons, the ratio of P16 to P56 could range from a low of 0.97 to a high of 1.40 or even greater.

One of the virtues of the CDF and present invention is it's capability to avoid the high over pressure condition, (i.e. a ratio of P16 to P56 greater than the minimum requirement).

FIG. 3 illustrates a more particular embodiment of the present invention in which severable more particular aspects of the invention are shown. The second flow splitter 48 may be axially positioned forward of (denoted by the solid line) or proximate to (denoted by the dashed line) the first flow splitter 42A axial location depending on the particular aerodynamic considerations for a given engine. The radially outer blade tip portions 107 and radially inner blade hub portions 109 respectively of blade airfoils 37 of the aft fan blades 36 are different airfoils with separate non-continuous profiles and leading and trailing edges LE and TE, respectively. The airfoils of the outer blade tip portions 107 may or may not be indexed, one to one, and generally aligned with the airfoils of the inner blade hub portions 109. The same construction may also be applied the radially outer vane tip portions 84 and the radially inner vane hub portions 86 of the fan vanes 34. The vane tip portion 84 may have an extended length pivotable trailing-edge tip flap 88 that extends aft of the trailing edge 121 of the independently pivotable trailing-edge inner flap 90 radially inner hub portion 86. Annular seals 45S are provided between the rotatable portion 108 of the annular duct wall 45 and adjacent stationary portions of the wall just forward and aft of it. The different airfoil profiles of the inner and outer blade and vane members of the core driven fan (CDF) 19 allow aerodynamic tuning of the supercharger means in the second inlet duct 43.

An example of an operating scenario that leads to a high over pressure condition is when engine or fan airflow 50 is maintained constant as the engine power setting, (commonly referred to a power lever angle because this is the action that is physically taken by the pilot of an aircraft), is reduced. To accomplish this objective, the engine exhaust nozzle 68 must be opened as power setting is reduced. Opening the exhaust nozzle 68 drops the pressure in the tail pipe 69 of the engine 10 and, therefore, drops the pressure of the airflow at the low pressure turbine exit labelled P56 aft of the low pressure turbine rotor blades 28. In this scenario it turns out that the speed of the core engine 18 drops slightly, a percent or so depending upon how far the throttle is retarded and, because engine airflow 50 is being held constant, fan speed remains unchanged. Since the low and high pressure spool speeds are maintained at constant speeds the pressure and airflow potential of the engine and its fans and compressors remains unchanged. Indeed, if the rear VABI doors 49 were closed appropriately, the level of pressure in the bypass duct P16, would remain substantially unchanged and a high P16/P56 would result. Except for a small tailpipe mixing advantage, this excess P16, and the energy that was required to produce the excess P16, is substantially wasted.

One prior art method to eliminate the excess bypass pressure is to incorporate a pressure loss device, such as a screen. This is like locking the barn door after the horse has gotten away, it does nothing beneficial for the cycle. A second way of lessening the penalty of an excessive P16 is to not close the rear VABI, as suggested above, and let the operating line on the blade tip portion 107 of the CDF 19 drop. Herein lies one of the reasons for separating the tip and hub flowpaths of the aft fan stator vanes 34 and the aft fan rotor blades 36. It is counter productive to what in effect amounts to desupercharging the rear compressor stages of the high pressure compressor 20 by dropping the operating line of the entire CDF 19 to reduce the level of P16. Without the flowpath division, the drop in the tip portion static pressure that accompanies the drop in it's operating line will be felt by the inner portion and result in a drop in it's operating line. There is still a problem with an operating line drop and that problem is that after the first five to ten percent drop, even though the CDF 19 stage outlet pressure continues to drop, the work input to the blade tip portion 107 of the CDF stops dropping. This is because the bypass stator vanes 58 choke and once this choke occurs further drop in back pressure can no longer affect the rotor exit of the CFD 19. The exit pressure of the bypass stator vanes 58 continues to drop by the creation of loss in the bypass stator vanes just as if a screen had been introduced into the bypass duct. As noted above, adding loss is undesirable.

Initially, the pressure in the bypass duct 40 is higher than discharge pressure of the forward fan 33 by the pressure ratio of the blade tip portion 107 of CDF 19. Because of this a bypass selector valve in the form of the selector valve 44 must be employed in the bypass duct 40 between the exit of the forward fan 33 and the outlet 47 of the second inlet duct 43 to prevent a recirculation of flow around an annular island 111 that provides the casing for the CDFS and the inner flowpath for the outer fan bypass duct 40. With a sufficient reduction in power setting a condition occurs wherein the pressure difference across the bypass selector valve reverses sign and the selector valve 44 can be opened. Until this condition is reached, the full airflow potential of the blade tip portion 107 of the CDF 19 must be retained. This is because any reduction in it's airflow potential will be manifested in an increase in the forward fan 33 operating line and a loss in available stall margin will result. After the bypass selector valve has opened, the airflow potential of the blade tip portion 107 can be diminished and the excess flow delivered by the fan can then be bypassed around the CDF 19 via the outer fan bypass duct 40.

The diminished airflow capability of the blade tip portion 107 of the CDF 19 is accomplished by closure of the variable pivotable trailing-edge flap 88 of the vane tip portion 84 in the flowpath within the annular duct wall 45 of the second inlet 46 forward of the blade tip portion 107. A result of this closure is that the pressure ratio potential of the blade tip portion 107 is diminished and both the airflow reduction and pressure ratio reduction act together to reduce the energy required to drive the blade tip portion of the engine, which is a very desirable effect from an engine efficiency and specific fuel consumption standpoint. Closure is not a full closing off of the second bypass air portion 56 in the inlet duct 43 but rather refers to a closing the angle to a closed position C indicated by the dashed outline of the variable pivotable trailing-edge flap 88 of the vane tip portion 84 relative to a nominal position N and direction of the rotatable the blade tips portion 107 which rotate a speed and direction U as illustrated FIG. 4. An opened position O indicated by the dotted outline of the trailing-edge flap 88 and a nominal position N indicated by the solid outline of the trailing-edge flap are also illustrated. The open position allows a greater flow rate, until a choking condition is encountered in passages between the vane tip portions 84, while the closed position reduces the flow rate as compared to the flow rate when the trailing-edge flaps 88 are at the nominal position N. Varying a vane, or in this case trailing-edge flaps 88, conventionally refers to varying the angle between open and closed positions relative to a nominal position and wheel or rotor speed U.

The above description addresses a typical off design operating scenario for the present invention. The invention also offers a design capability and advantage which is also important. Generally, the blade hub 109 of the CDF 19 can be designed to operate at, or near, it's highest pressure ratio potential. This allows a lower number of the stages of the high pressure compressor 20 than would otherwise be possible, a seemingly obvious design goal. The overall fan pressure ratio, i.e. the product of low pressure spool pressure ratio with the pressure ratio of the blade tip portion 107 of the CDF 19, is a fallout of the cycle analysis and depends upon all of a myriad of assumptions that are assembled into a design matchpoint. The sensitivity of overall fan pressure ratio varies widely within the normal range of assumptions, therefore, each new situation needs to be examined on it's own merits. The fans will want to operate at or near their highest potential. The required pressure ratio of the blade tip portion 107 of the CDF 19 falls out from the division of the required overall fan pressure ratio by the low pressure spool fan pressure ratio. The resulting CDF tip pressure ratio may be near, well below or well above the pressure ratio potential of the blade hub 109 of the CDF 19. Without the circumferential annular rotatable portion 108 of the annular duct wall 45 disposed between radially outer blade tip and radially inner blade hub portions 107 and 109, respectively, dividing the blade airfoils 37 into two distinctly different regions, a sort of natural continuum between hub and tip portions would exist. This is because the static pressure cannot be discontinuous without the physical division and because the blading will be a smooth and continuous blend from the blade base 41 to the blade tip 38. It is incumbent upon the analyst to contain all of these items with bounds but a fundamental capability is available in the CDF 19 to enable a fine tuning of the cycle.

Growth is always a consideration that must be considered and a unique growth capability is offered by the present invention. It is highly desirable for military fighter aircraft, in particular, to accommodate thrust growth without a change in engine airflow 50 since the inlet and fuselage are very much aerodynamically coupled and are often integral with each other and an increase in engine airflow requires an increase in engine's inlet hole size which may also necessitate a modification of the fuselage. Engine exhaust nozzle 68 pressure increase, which is synonymous with fan overall pressure ratio increase, will increase thrust per pound of gas and, therefore, total engine thrust at constant airflow. The key is to increase firing temperature in the combustor 22 which will, in turn, increase the pressure of the airflow at the low pressure turbine exit P56 and create the need to increase the pressure at the aft portion of the bypass duct P16. The P16 bypass pressure can be increased by a simple modification to the blade tip portion 107 of the CDF 19 without any other change in the compression turbomachinery which includes all fan and compressor stages. By any normal standard this constitutes minimum engine change.

A row of high pressure turbine (HPT) stator vanes 110 (also commonly referred to as turbine nozzle vanes) is disposed longitudinally aft of the combustor 22 and leads to the high pressure turbine 23 and its high pressure turbine blades 24. Means are provided for varying the angles of and the flow rate through the HPT stator vanes 110. Preferably, such means include at least one (and preferably all) of the HPT stator vanes 110 being a variable vane and, preferably, a pivotable vane with an actuation lever 112 for pivoting the HPT stator vanes 110. Other such means have been previously discussed with respect to varying the angle of and flow rate through the fan stator vanes 34.

FIG. 1 shows only one row of high pressure turbine blades 24, only one row of low pressure turbine rotor blades 28, and only one row of turbine stator vanes 34, although additional rows of turbine rotor blades and stator vanes may be included in the design of a particular engine. In another embodiment of the present invention, as shown in FIG. 1, a longitudinally aft most row of high pressure turbine blades 24 is disposed longitudinally aft of the row of high pressure turbine stator vanes 110. A longitudinally forward most row of low pressure turbine rotor blades 28 is disposed longitudinally aft of the aft row of high pressure turbine blades 24. A row of low pressure turbine stator vanes 66 is disposed longitudinally between the aft row of high pressure turbine blades 24 and the forward row of low pressure turbine blades 28. Means are provided for varying the flow area of the low pressure turbine (LPT) nozzle vanes 66. Preferably, such means include at least one (and preferably all) of the LPT nozzle vanes 66 being a variable vane and, preferably, a pivotable vane with an actuation lever 114 for pivoting the vanes 66. It is conventionally well known by those skilled in the art that having the LPT vanes 66 be variable allows for more efficient engine operation just as for the variable HPT stator vanes 110 previously discussed. This combination of features improves part power specific fuel consumption, as can be appreciated by those skilled in the art. In a second embodiment of the present invention, as shown in FIG. 2, the HPT blades 24 and the LPT blades 28 are counter-rotating. This allows the row of LPT stator vanes 66 to be omitted, if so desired, thereby, forming what is referred to as a vaneless turbine arrangement.

The engine 10 can include a turbine cooling air modulation system utilized when the engine is operating at reduced power setting for added engine efficiency, such as those described in (but not limited to) U.S. Pat. Nos. 4,296,599 or 4,807,433, as can be appreciated by those skilled in the art. The vaneless turbine arrangement and variable pressure ratio core fan tip coupled with cooling air modulation results in a change in HPT exit swirl. This swirl change in a vaneless counter-rotating HPT and LPT design results in an aerodynamically induced increase in LPT flow function. The beneficial result of the increased LPT flow function lessens or reduces the need for having to have a variable geometry feature in the LPT.

Specifically, FIGS. 1 and 2 disclose a turbine cooling air modulation system including an HPT inducer 116 and an LPT inducer 118 each including a valve responsive to temperature change or to engine control commands which regulates the turbine cooling flow taken from compressor bleed air 120. The turbine cooling air modulation is provided to allow scheduled control of the quantity of compressor air used to cool both the HPT and LPT blades. High levels of cooling air flow are needed during maximum thrust operation while only a small fraction of this cycle performance penalizing cooling air flow is needed during part power operation. As mentioned, these modulators include multiple flow cooling air inducers 116 and 118 or supply pipes that contain flow control valves for modulation purposes. They may be located in the engine positions shown or elsewhere in the cooling air circuit.

In operation, as can be appreciated by those skilled in the art, the variable geometry fan features and the selector valve and VABI and intermediate mixer doors permit bypass duct pressure levels to be controlled independently from core supercharging pressure levels. Also, the variable geometry turbine systems allow overall cycle pressure ratio to be controlled as turbine temperature varies to match the cycle balance requirements of the variable fan pressure ratio system. The variable geometry fan feature further allows the core fan tip pressure to be either phased in as thrust is increased from part to full power or phased out as thrust is reduced from full to part power. The ability to control the high pressure turbine flow function by mechanical means coupled with a corresponding aerodynamically derived change in LPT flow function are key elements of the invention that improve part power cruise performance. By adjusting the high and low pressure turbine flow functions, overall pressure can be maintained as fan pressure ratio is reduced from a very high level (full core fan tip pressure rise) to essentially front fan pressure ratio (core fan tip phased out). A very large change in turbine temperature accompanies the phase in/phase out of the core fan tip. Without a set of variable geometry turbines a significant core speed reduction would occur with a corresponding reduction in cycle pressure ratio and loss of part power performance potentials. The potential specific fuel consumption improvement for this mode of operation is dependent on the maximum level of overall fan pressure ratio (5–7+) and the front fan design pressure level (3–4). Five to ten percent improvement should result for engines that have a maximum fan pressure ratio in the 5:1 class. Ten to fifteen percent part power specific fuel consumption improvements can result for engines that have a 6–7:1 maximum fan pressure level.

Specifically, from ground idle to an intermediate level of dry thrust (a part dry power level) where maximum rotor speeds, full fan flow, and intermediate turbine temperatures occur, the engine 10 operates essentially as a conventional mixed flow turbofan. The selector valves 44 are opened, and the outer portion 84 (i.e., the trailing edge flap 88 of the outer portion 84) of the core fan stator vanes 34 are closed to a 60–80 degree inlet guide vane (IGV) setting. The HPT stator vanes 110 are closed to optimize compressor performance. If there are LPT stator vanes 66 as in FIG. 1, they will be set in an open setting to control HP-LP rotor speed relationships needed to optimize engine performance. For counter-rotation vaneless designs, as in FIG. 2, the optimal LPT flow function changes result aerodynamically due to the varying HPT exit swirl and counter-rotation flow fields of the two close-coupled turbine rotors. The rear VABI door 49 is used to hold the required ratio of duct exit to core discharge pressure. The variable area jet exhaust nozzle 122 is varied in area to obtain optimum part power engine performance.

From this intermediate level of dry thrust to a maneuver level of dry thrust power, the above settings are changed as the overall fan pressure ratio is increased to raise turbine temperatures. Now, the cooling air modulator valves are opened to increase flow to the turbine cooling circuit. The HPT stator vanes 110 are opened increasing HPT vane flow area to maintain adequate core stall margin. If there is an LPT stator vane 66, as in FIG. 1, it is closed to maintain HP speed. For counter-rotation vaneless designs, as in FIG. 2, the increased exit swirl from the HPT blades 24 aerodynamically creates a closed flow function level for the LPT. (This process goes in the reverse direction when reducing thrust from a maximum level). The outer portion 84 (i.e., the trailing edge flap 88 of the outer portion 84) of the core fan stator vanes 34 is opened from a 60–80 degree level to a 0 (fully open) level as power is increased from an intermediate level to a maximum level of dry thrust power. This increases the core fan tip pressure ratio and effectively uses the increased core energy created by the increased fuel flow to greatly increase the overall pressure level of the mixed exhaust gasses, resulting in a significant percentage (less than 100%) increase in engine dry thrust. The selector valves 44 are closed at a power setting slightly above intermediate and are kept closed (defining single bypass operation). The rear VABI door 49 is used to control the pressure relationship between the duct and core discharge. The area of the variable exhaust nozzle 122 is reduced as overall nozzle pressure levels increase.

The foregoing descriptive embodiments of the invention have been presented for the purpose of describing and illustrating the invention. It is not intended to be exhaustive or to limit the invention to the precise form disclosed, and obviously many modifications and variations are possible in light of the above teachings. For example, although a preferred design has the more forward row of fan rotor blades 32 be low-pressure-turbine-driven fan blades and the more aft row of fan rotor blades 36 be high-pressure-driven fan blades, other designs may include the more forward fan blade row and/or more aft fan blade row driven by the low or high pressure turbine. Also, although an exemplary embodiment has all of the fan stator vanes 34 in its row including independently variable radially outer and radially inner portions 84 and 86, other designs may include additional fan stator vanes consisting only of vane tip portions which are variable. An afterburner 130 may also be used to increase the thrust potential of the engine.

While the preferred embodiment of our invention has been described fully in order to explain its principles, it is understood that various modifications or alterations may be made to the preferred embodiment without departing from the scope of the invention as set forth in the appended claims.

I claim:

1. A multiple bypass turbofan engine comprising:
    a core engine assembly comprising in downstream serial flow relationship a core driven aft fan, a core compressor, a core combustor, and a core turbine, and said core turbine drivingly connected to said aft fan and said core compressor by a core engine shaft;
    a low pressure turbine driven forward fan upstream and forward of said aft fan and drivingly connected to a low pressure turbine by a low pressure shaft;
    said low pressure turbine being aft of and in serial flow communication with said core turbine;
    a fan bypass duct disposed radially outward of said core engine assembly and having first and second inlets disposed between said forward and aft fans;
    an annular inlet duct having an annular duct wall, said annular duct wall disposed radially inward of said bypass duct, and said annular inlet duct connecting said second inlet to said bypass duct;
    said aft fan having a row of aft fan rotor blades disposed adjacent to and longitudinally aft of a row of aft fan stator vanes;
    said aft fan rotor blades having airfoils that generally extends radially outward from blade airfoil bases to airfoil tips; and
    at least one of said aft fan stator vanes has an independently variable radially outer vane tip portion and an independently variable radially inner vane hub portion separated by a non-rotatable portion of said annular duct wall and said aft fan blades having radially outer airfoil tip sections and radially inner hub sections of airfoils separated by a rotatable portion of said annular duct wall, such that said tip sections are disposed in said inlet duct.

2. A multiple bypass turbofan engine as claimed in claim 1, further comprising a means for independently varying said vane tip portion and said vane hub portion.

3. A multiple bypass turbofan engine as claimed in claim 2, wherein said vane tip portion includes a pivotable, trailing-edge tip flap and said vane hub portion includes an independently pivotable, trailing-edge hub flap.

4. A multiple bypass turbofan engine as claimed in claim 3, wherein said varying means includes means for independently pivoting said flaps.

5. A multiple bypass turbofan engine as claimed in claim 1, wherein of said fan stator vanes have independently variable radially outer vane tip portions and independently variable radially inner vane hub portions separated by a non-rotatable portion of said annular duct wall.

6. A multiple bypass turbofan engine as claimed in claim 5, wherein said vane tip portions include pivotable, trailing-edge tip flaps and said vane hub portions include independently pivotable, trailing-edge hub flaps.

7. A multiple bypass turbofan engine as claimed in claim 6, wherein said varying means includes means for independently pivoting said flaps.

8. A multiple bypass turbofan engine as claimed in claim 7, said core turbine further comprising a row of high pressure turbine stator vanes and means for varying the flow area of said high pressure turbine nozzle vanes.

9. A multiple bypass turbofan engine as claimed in claim 8, said low pressure turbine further comprising a row of counter-rotating low pressure turbine rotor blades disposed longitudinally adjacent and longitudinally aft of said core turbine such said row of low pressure turbine blades are operable to counter-rotate to high pressure turbine rotor blades in said core turbine during engine operation.

10. A multiple bypass turbofan engine as claimed in claim 8, said low pressure turbine further comprising:
- a row of low pressure turbine rotor blades disposed longitudinally adjacent and longitudinally aft of said core turbine,
- a row of low pressure turbine stator vanes disposed longitudinally between said core turbine aft and said forward row of low pressure turbine blades; and
- means for varying the flow area of said low pressure turbine nozzle vanes.

11. A multiple bypass turbofan engine comprising:
- a core engine assembly comprising in downstream serial glow relationship a core driven-aft fan, a core compressor, a core combustor, and a core turbine, and said core turbine drivingly connected to said aft fan and said core compressor by a core engine shaft;
- a low pressure turbine driven forward fan upstream and forward of said aft fan and drivingly connected to a low pressure turbine by a low pressure shaft;
- said low pressure turbine being aft of and in serial flow communication with said core turbine;
- a fan bypass duct disposed radially outward of said core engine assembly and having annular first and second inlets disposed between said forward and aft fans;
- an annular inlet duct having an annular duct wall, said annular duct wall disposed radially inward of said bypass duct, and said inlet duct connecting said second inlet to said bypass duct;
- a supercharger means for compressing air disposed in said inlet duct and drivingly connected to said core turbine;
- said aft fan further comprising;
    - radially inner and outer rows of aft fan vane airfoils separated by a non-rotatable portion of said annular duct wall such that said outer row of aft fan vane airfoils are disposed in said inlet duct and at least one of said outer aft fan vane airfoils is independently variable;
    - radially inner and outer rows of aft fan rotor blade airfoils separated by a rotatable portion of said annular duct wall such that said outer row of aft fan rotor blade airfoils are disposed in said inlet duct adjacent to and longitudinally aft of radially inner and outer rows of aft fan vane airfoils, respectively; and
- said supercharger means comprising said radially outer rows of aft fan vane and rotor blade airfoils.

12. A multiple bypass turbofan engine as claimed in claim 11, further comprising a means for independently varying said radially outer and inner rows of aft fan vane airfoils.

13. A multiple bypass turbofan engine as claimed in claim 12, wherein said outer vane airfoils include pivotable, trailing-edge outer flaps and said inner vane airfoils include independently pivotable, trailing-edge inner flaps.

14. A multiple bypass turbofan engine as claimed in claim 13, wherein said varying means includes means for independently pivoting said flaps.

15. A multiple bypass turbofan engine as claimed in claim 14, said core turbine further comprising a row of high pressure turbine stator vanes and means for varying the flow area of said high pressure turbine nozzle vanes.

16. A multiple bypass turbofan engine as claimed in claim 14, wherein said radially inner and outer rows of aft fan vane airfoils are indexed and generally aligned and said radially inner and outer rows of aft fan rotor blade airfoils are indexed and generally aligned.

* * * * *